United States Patent
Weber

(10) Patent No.: US 6,559,466 B2
(45) Date of Patent: May 6, 2003

(54) DEVICE AND METHOD FOR AUTOMATICALLY ADAPTING A LIGHT SENSOR TO A WINDSCREEN

(75) Inventor: Thomas Weber, Ludenscheid (DE)

(73) Assignee: Leopold Kostal GmbH & Co., Ludenscheid (DE)

( * ) Notice: Subject to any disclaimer, the term of this patent is extended or adjusted under 35 U.S.C. 154(b) by 0 days.

(21) Appl. No.: 10/094,681

(22) Filed: Mar. 11, 2002

(65) Prior Publication Data

US 2002/0117606 A1 Aug. 29, 2002

Related U.S. Application Data

(63) Continuation of application No. PCT/EP01/07880, filed on Jul. 9, 2001.

(30) Foreign Application Priority Data

Jul. 11, 2000 (DE) .......................................... 100 33 609

(51) Int. Cl.⁷ ............................................... G01N 21/25
(52) U.S. Cl. ................. 250/573; 250/227.25; 250/226; 356/434
(58) Field of Search ................................. 250/573, 574, 250/222.2, 221, 216, 227.25, 341.7, 341.8, 226; 356/432, 433, 434, 436; 318/483, DIG. 2; 340/602; 362/465

(56) References Cited

U.S. PATENT DOCUMENTS 4,973,844 A * 11/1990 O'Farrell et al. ........ 250/341.7
6,018,165 A 1/2000 Kerkmann et al.
6,285,037 B1 * 9/2001 Koyama et al. ............ 250/574

FOREIGN PATENT DOCUMENTS

| DE | 3532 199 A1 | 9/1985 |
| DE | 3715798 A1 | 5/1987 |
| DE | 195 23 262 A1 | 8/1995 |
| WO | WO 01/05626 A1 | 1/2001 |

* cited by examiner

Primary Examiner—Kevin Pyo
(74) Attorney, Agent, or Firm—Brooks & Kushman, P.C.

(57) ABSTRACT

A device and a method for automatically adapting a light sensor to the light transmission properties of a windshield include determining the light transmission properties of the windshield for light having at least two different wavelengths. Light intensities of each of at least two different wavelengths of a light beam transmitted by a transmitter along a path through the windshield are measured by a light receiver. The measured light intensities are compared with reference light intensity values associated with clear glass. Transmission properties of the windshield are then calculated based on the comparison between the measured light intensities and the reference light intensity values. The light sensor is then adapted as a function of the calculated transmission properties of the windshield.

16 Claims, 2 Drawing Sheets

DEVICE AND METHOD FOR AUTOMATICALLY ADAPTING A LIGHT SENSOR TO A WINDSCREEN

CROSS-REFERENCE TO RELATED APPLICATIONS

This is a continuation of International Application PCT/EP01/07880, published in German with an international filing date of Jul. 9, 2001.

BACKGROUND OF THE INVENTION

1. Field of the Invention

The invention concerns a device and a method for automatically adapting a light sensor to the light transmission characteristics of a windshield of a vehicle, wherein the light sensor is allocated to an automatic control device for switching lighting devices of a motor vehicle on and off and wherein the light sensor is located in an area of the windshield.

2. Background Art

A control device of the type in question is known from DE 195 23 262 A1. The control device is associated with a light sensor having an ambient light sensor for the nondirectional determination of general light conditions (brightness) in the vehicle surroundings and an oriented directional sensor for determining the light conditions in the driving direction. The light sensor is connected to an electronic evaluation device. The evaluation device takes into account the signals of both the sensors and the current switching state of the lighting devices to determine whether a change in the switching states of the lighting devices is required. As a result of this known control device, the automatic switching on and off of the lighting device of a vehicle is in principle possible in many situations with changing light conditions, such as the onset of night or long drives through tunnels.

The light sensor associated with the control device is located behind the windshield, approximately in the area of the base of the rearview mirror. On one hand, this location allows the determination of ambient brightness which is affected only slightly by the vehicle, and, on the other hand, it is nearly ideal for measuring the direction specific brightness in the driving direction. A drawback of this location is that the light flux received by the individual sensors must first pass through the windshield where, under certain circumstances, its properties change. This is particularly true in the case of current vehicle designs, where heat-insulated glass is increasingly used, which, as a result of the absorption or reflection of infrared radiation into the visible spectrum, changes the spectral composition of the light, or, in the case of so-called color prisms used in the upper area of the windshield, which have a strong filtering effect on the visible spectrum.

SUMMARY OF THE INVENTION

Accordingly, it is an object of the present invention to provide a device and a method for automatically adapting such a control device, particularly the light sensor assigned to it, to the light transmission properties of each given windshield.

In carrying out the object and other objects, the present invention provides a device and a method in which the transmission properties of the windshield are determined at at least two different wavelengths and compared with known reference values.

Further, in carrying out the object and other objects, the present invention provides a device for automatically adapting a light sensor to light transmission characteristics of a windshield of a vehicle. The light sensor is associated with an automatic control device for switching lighting devices of the vehicle on and off and is located adjacent the interior side of the windshield. The device includes at least one light receiver located adjacent the interior side of the windshield for receiving a light beam. A light transmitter is located adjacent the interior side of the windshield for transmitting a light beam having at least two different fixed wavelengths in the visible and/or infrared light spectral range. A light conducting body couples the light beam transmitted from the light transmitter to the at least one light receiver along a path which includes transmission through the windshield and at least one reflection on the exterior side of the windshield.

The device may further include a memory unit for storing light intensity reference values associated with each fixed wavelength of the light beam. A processor may compare light intensity values of each fixed wavelength of the light beam received by the at least one light receiver with the light intensity reference values in order to adapt the light sensor to the light transmission characteristics of the windshield. The light transmitter may include a light emitting diode operable for transmitting a visible light beam at three different fixed wavelengths.

Also, in carrying out the object and other objects the present invention provides a method for automatically adapting a light sensor to light transmission properties of a windshield of a vehicle. The light sensor is associated with an automatic control device for switching lighting devices of the vehicle on and off and is located adjacent the interior side of the windshield. The method includes transmitting a light beam having at least two different fixed wavelengths $\lambda_1, \ldots, \lambda_n$ from at least one light transmitter located adjacent the interior side of the windshield. A light conducting body couples the light beam transmitted from the light transmitter to at least one light receiver located adjacent the interior side of the windshield along a path which includes transmission through the windshield.

The light intensities $I_1, \ldots, I_n$. Of each of the at least two different fixed wavelengths $\lambda_1, \ldots, \lambda_n$ of the light beam received by the at least one light receiver are then measured. The measured light intensities $I_1, \ldots, I_n$ are compared with reference light intensity values $I_{r1}, \ldots, I_{rn}$. Transmission properties of the windshield are then calculated based on the comparison between the measured light intensities $I_1, \ldots, I_n$ and the reference light intensity values $I_1, \ldots, I_n$. Operating parameters of the automatic control device or of the light sensor are then influenced as a function of the calculated transmission properties of the windshield.

The step of calculating may include determining the type of the windshield from the calculated transmission properties of the windshield. The step of influencing may include influencing operating parameters of the control device or of the light sensor as a function of the determined windshield type.

The reference light intensity values $I_{r1}, \ldots, I_{rn}$ are the reference light intensity values of a pane of clear glass for each of the at least two different fixed wavelengths $\lambda_1, \ldots, \lambda_n$ of a light beam received by a light receiver from a light transmitter along the path.

BRIEF DESCRIPTION OF THE DRAWINGS

Further embodiments and advantageous variants of the device according to the present invention as well as the associated method are described in conjunction with reference to the drawings.

DETAILED DESCRIPTION OF THE PREFERRED EMBODIMENT(S)

Figure 1:
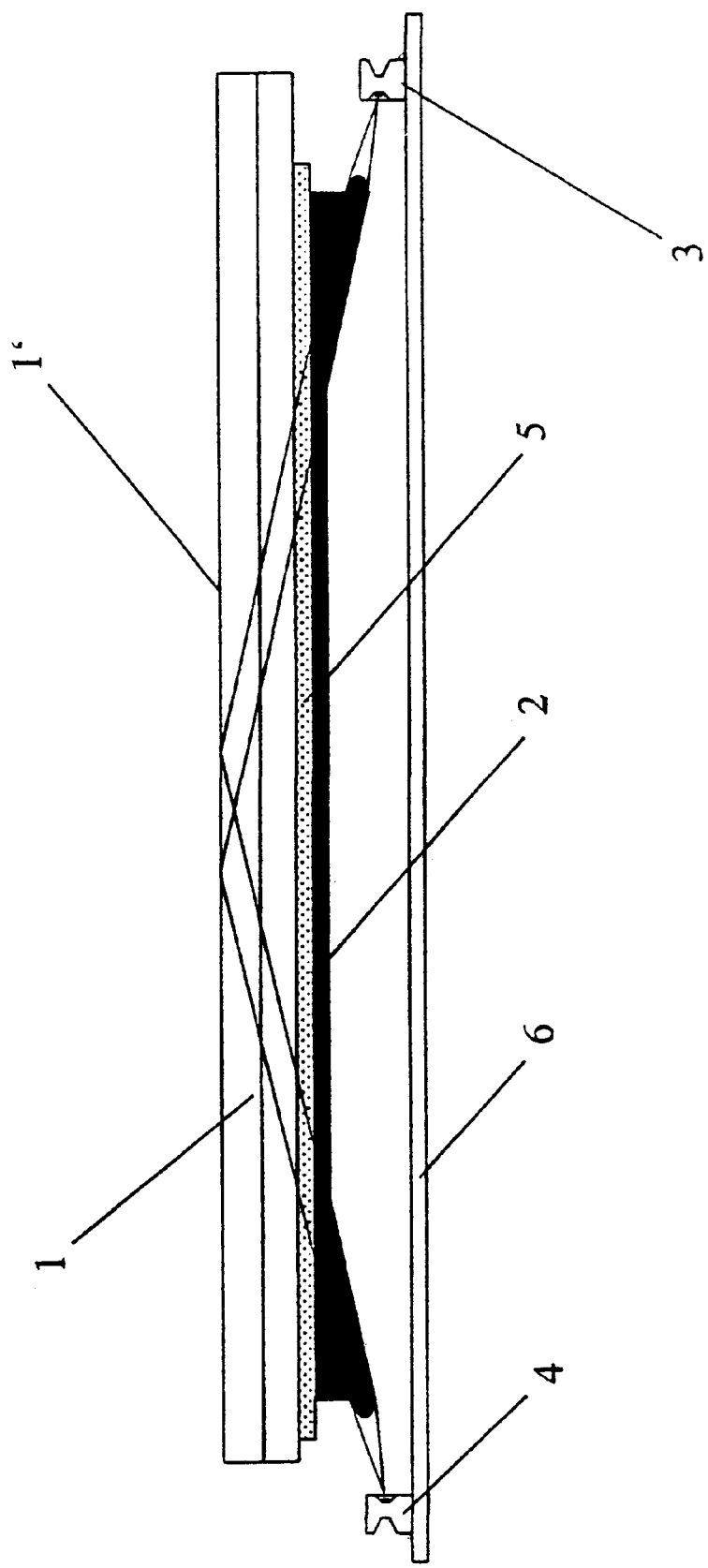
FIG. 1 illustrates a cross-section of the device according to the present invention.

Referring now to FIG. 1, a device according to the present invention includes a radiation (light) conducting body 2. Light-conducting body 2 is optically coupled to the interior side of a windshield 1 by means of a transparent intermediate layer 5. Transparent intermediate layer 5 can be, for example, in the form of a self-adhesive flexible film. A radiation (light) transmitter 4 and a radiation (light) receiver 3 are allocated to light conducting body 2 and arranged as surface mounted device (SMD) components on a conductive plate 6. At least part of the radiated (light) beam emitted by light transmitter 4 is made parallel by light conducting body 2 and is coupled to windshield 1 at such a low angle that total reflection on the exterior side 1' of windshield 1 occurs even it is wet with humidity. This totally reflected light beam is then output coupled from windshield 1 by light conducting body 2 and is focused on light receiver 3.

For light receiver 3, it is advantageous to use a component of the same type as that used in a sensor that detects ambient light or oncoming light, and which is allocated to an automatic control device for switching the lighting devices of a vehicle on and off. Under certain circumstances, it is even possible to use such an existing sensor instead of an additional light receiver 3, if a correspondingly designed light conducting body 2 can be integrated into the existing light sensor. For light transmitter 4, an RGB (red, green, blue) light emitting diode (LED) which can emit light beams as desired at one of the three wavelengths $\lambda_1$=470 nm, $\lambda_2$=565 nm, and $\lambda_3$=625 nm is used.

For adapting the light sensor to a given windshield 1, according to the method of the present invention, during the first use of the automatic control device for switching lighting devices on and off, light transmitter 4 successively emits light at wavelengths $\lambda_1$=470 nm, $\lambda_2$=565 nm, and $\lambda_3$=625 nm. In the process, the light intensities $I_1$, $I_2$, and $I_3$ which strike light receiver 3 are each measured and recorded. The measured light intensities $I_1$, $I_2$, and $I_3$ are compared with reference light intensity values $I_{r1}$, $I_{r2}$, and $I_{r3}$. For example, a micro-controller compares the measured light intensity values $I_1$, $I_2$, and $I_3$ with reference light intensity values $I_{r1}$, $I_{r2}$, and $I_{r3}$ stored in a memory element. The result of this comparison is used to either directly influence the operating parameters of the automatic control device and, in particular, of the light sensor allocated to the control device; or to indirectly influence these operating parameters by an intermediate step of identifing the given windshield as belonging to a series of such windshields with known light transmission properties, which are also stored in the memory component.

The reference light intensity values $I_{r1}$, $I_{r2}$, and $I_{r3}$ that are used for comparison are stored in the memory component and are preferably used in the context of a final operating verification carried out during the manufacturing process of the control device by means of a reference measurement which is to be carried out using, for example, a pane of clear glass. In comparison with the use of fixed predetermined reference light intensity values that are identical for all individual examples, the above-described method of the present invention has the advantage of largely eliminating the effect of the sometimes large scattering produced by opto-electronic transmission or receiving elements with respect to intensity efficiency or sensitivity.

Figure 2:
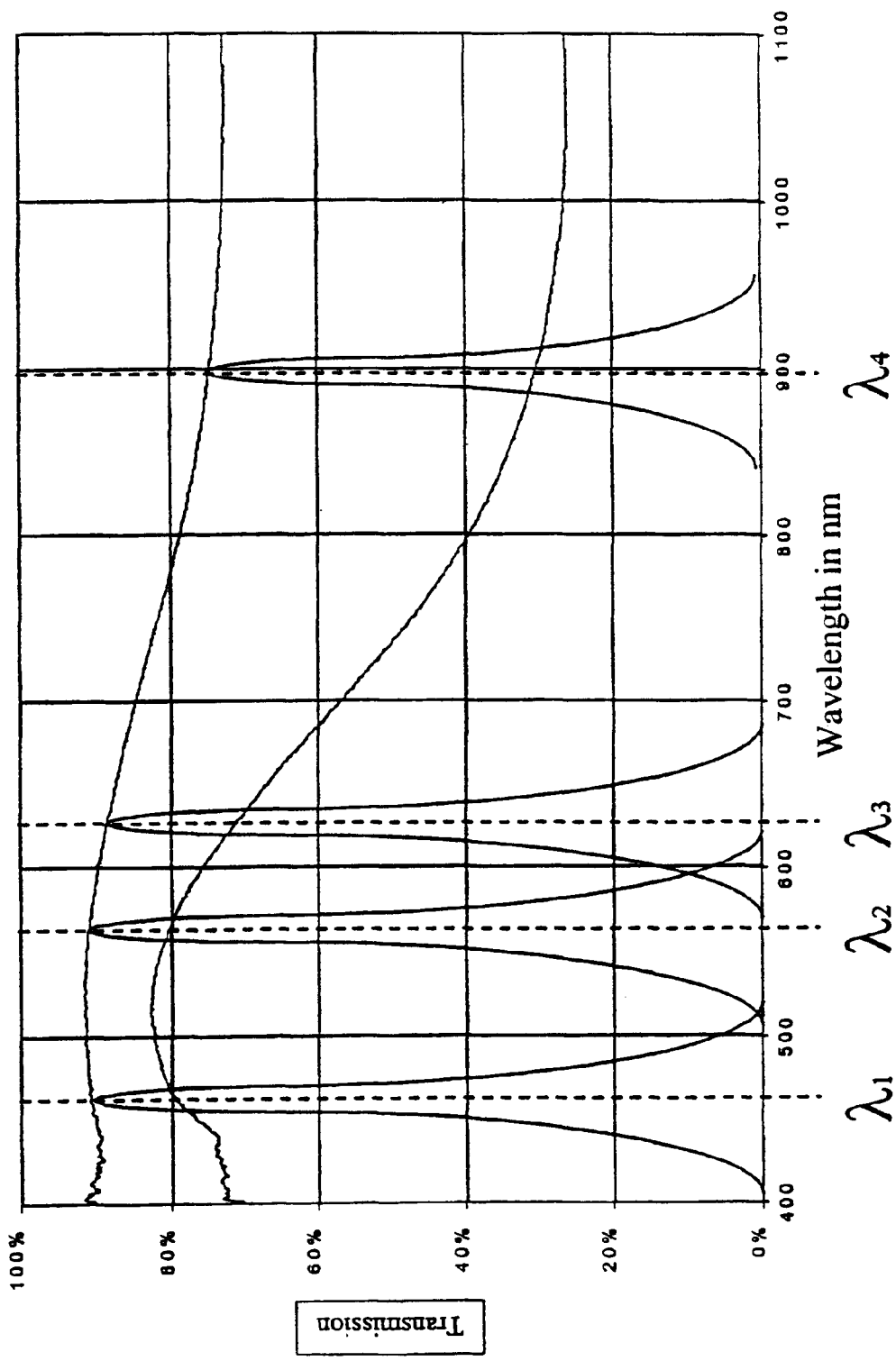
FIG. 2 illustrates the transmission characteristics of clear glass and heat-insulated glass.

FIG. 2, for example, illustrates the transmission values for clear glass and heat-insulated glass as a function of the radiation (light) wavelength for the visible and near-infrared light spectrum range. Using the measured light intensities $I_1$, $I_2$, and $I_3$ which are to be determined at the wavelengths $\lambda_1$=470 nm, $\lambda_2$=565 nm, or $\lambda_3$=625 nm by a device according to the present invention, the two windshield types are clearly distinguished as is apparent. If a rain sensor is applied to windshield 1, which operates according to a similar optical principle of operation in the near infrared spectrum, then it is also possible to use the light transmission values determined by the latter sensor as well, for example, at an additional wavelength such as $\lambda_4$=895 nm for the evaluation.

Under certain circumstances, the presence of a rain sensor particularly if it is integrated with the light sensor in an element—offers the possibility of completely eliminating the use of a specific light conducting body for the device according to the present invention and to use the existing light conducting body of the rain sensor. Although in the latter the beam path is such that if windshield 1 is wet with humidity, a disturbance in the total reflection occurs, the use in the sense of the present invention is possible without problem if the windshield is dry. However, for this purpose, it is necessary that instead of the LED conventionally used in a rain sensor, which is suitable only for the emission of light at a single wavelength (usually in the infrared spectrum), the possibility must exist to emit light at at least two different wavelengths without the need to alternatively use, in the case of the presence of several rain sensor paths, at least two of these paths with different wavelengths.

In a preferred embodiment variant, for example, several rain sensor paths are each provided with LEDs with a different wavelength combination; for example, a first "infrared and red" path, a second "infrared and green" path, and a third "infrared and blue" path. By means of these combinations, operation in the sense of the device according to the present invention is possible using four different wavelengths, where in each case only the infrared component is used for the rain sensor function. However, in another variant, visible light is used instead of infrared radiation in one, for example, out of a total of four rain sensor paths. For this purpose, in a preferred modification of this variant, that sensor path is equipped with an RGB LED as a suitable receiver.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A device for automatically adapting a light sensor to light transmission characteristics of a windshield of a vehicle, wherein the light sensor is associated with an automatic control device for switching lighting devices of the vehicle on and off and is located adjacent the interior side of the windshield, the device comprising:

at least one light receiver located adjacent the interior side of the windshield for receiving a light beam;

a light transmitter located adjacent the interior side of the windshield for transmitting a light beam having at least two different fixed wavelengths in the visible and/or infrared light spectral range; and a light conducting body for coupling the light beam transmitted from the light transmitter to the at least one light receiver along a path which includes transmission through the windshield and at least one reflection on the exterior side of the windshield.

2. The device of claim 1 further comprising:

a memory unit for storing light intensity reference values associated with each fixed wavelength of the light beam; and a processor for comparing light intensity values of each fixed wavelength of the light beam received by the at least one light receiver with the light intensity reference values in order to adapt the light sensor to the light transmission characteristics of the windshield.

3. The device of claim 1 wherein:

the light transmitter includes a light emitting diode operable for transmitting a visible light beam at three different fixed wavelengths.

4. A device for automatically adapting a light sensor to light transmission characteristics of a windshield of a vehicle, wherein the light sensor is associated with an automatic control device for switching lighting devices of the vehicle on and off and is located adjacent the interior side of the windshield, the device comprising:

at least one light receiver located adjacent the interior side of the windshield for receiving light beams;

at least two light transmitters located adjacent the interior side of the windshield for transmitting respective light beams having a different fixed wavelength lambda n in the visible and/or infrared spectral range; and a light conducting body for coupling the light beams transmitted by the at least two light transmitters to the at least one light receiver along a path which includes transmission through the windshield and at least one reflection on the exterior side of the windshield.

5. The device of claim 4 further comprising:

an optically transparent intermediate layer for coupling the light conducting body to the interior side of the windshield.

6. The device of claim 4 wherein:

the at least one light receiver, the at least two light transmitters, and the light conducting body are arranged such that the light conducting body couples the light beams transmitted by the at least two light transmitters to the at least one receiver along a path having an angle such that the at least one reflection on the exterior side of the windshield occurs even if the exterior side of the windshield is wet with humidity.

7. The device of claim 4 wherein:

the light conducting body is formed as part of a light conducting body of a rain sensor.

8. The device of claim 7 wherein:

the at least one light receiver and the at least two light transmitters are suitable for use as a rain sensor.

9. The device of claim 8 wherein:

the at least one light receiver includes at least two light receivers, wherein each of the at least two light receivers receives a light beam from a respective one of the at least two light transmitters such that a different combination of light beams having different fixed wavelength lambda n are received by the at least two light receivers.

10. The device of claim 4 wherein:

the at least one light receiver is formed by a light receiver associated with the light sensor for sensing ambient light conditions of the vehicle.

11. The device of claim 10 wherein:

the at least two light transmitters used for verifying the operation of the light sensor in an integrated state.

12. The device of claim 4 wherein:

the light sensor includes a direction sensor for sensing the light conditions in the driving direction in front of the vehicle.

13. The device of claim 4 further comprising:

a memory unit for storing light intensity reference values; and a processor for comparing light intensity values of the light beams received by the at least one light receiver with the light intensity reference values in order to adapt the light sensor to the light transmission characteristics of the windshield.

14. A method for automatically adapting a light sensor to light transmission properties of a windshield of a vehicle, wherein the light sensor is associated with an automatic control device for switching lighting devices of the vehicle on and off and is located adjacent the interior side of the windshield, the method comprising:

transmitting a light beam having at least two different fixed wavelengths $\lambda_1, \ldots, \lambda_n$ from at least one light transmitter located adjacent the interior side of the windshield;

using a light conducting body to couple the light beam transmitted from the light transmitter to at least one light receiver located adjacent the interior side of the windshield along a path which includes transmission through the windshield;

measuring light intensities $I_1, \ldots, I_n$ of each of the at least two different fixed wavelengths $\lambda_1, \ldots, \lambda_n$ of the light beam received by the at least one light receiver;

comparing the measured light intensities $I_1, \ldots, I_n$ with reference light intensity values $I_{r1}, \ldots, I_{rn}$;

calculating transmission properties of the windshield based on the comparison between the measured light intensities $I_1, \ldots, I_n$ and the reference light intensity values $I_{r1}, \ldots, I_{rn}$; and influencing operating parameters of the automatic control device or of the light sensor as a function of the calculated transmission properties of the windshield.

15. The method of claim 14 wherein:

the step of calculating includes determining the type of the windshield from the calculated transmission properties of the windshield, wherein the step of influencing includes influencing operating parameters of the control device or of the light sensor as a function of the determined windshield type.

16. The method of claim 14 wherein:

the reference light intensity values $I_{r1}, \ldots, I_{rn}$ are the reference light intensity values of a pane of clear glass for each of the at least two different fixed wavelengths $\lambda_1, \ldots, \lambda_n$ of a light beam received by a light receiver from a light transmitter along the path.

* * * * *